(12) United States Patent
Araki et al.

(10) Patent No.: US 6,584,057 B1
(45) Date of Patent: *Jun. 24, 2003

(54) OPTICAL PICKUP SYSTEM

(75) Inventors: Yoshitsugu Araki, Tokyo (JP); Noriaki Murao, Tokyo (JP)

(73) Assignee: Pioneer Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/397,874

(22) Filed: Sep. 17, 1999

(30) Foreign Application Priority Data

Sep. 18, 1998 (JP) .......................... 10-283399

(51) Int. Cl.[7] ................................. G11B 7/00
(52) U.S. Cl. ................................. 369/112.02
(58) Field of Search .......... 369/112.23, 112.24, 369/112.02, 112.05, 44.24

(56) References Cited

U.S. PATENT DOCUMENTS

| | | | | |
|---|---|---|---|---|
| 5,513,158 A | * | 4/1996 | Ohsato | 369/112 |
| 5,809,001 A | * | 9/1998 | Gage et al. | 369/112 |
| 5,901,131 A | * | 5/1999 | Ootaki et al. | 369/112 |
| 5,930,219 A | * | 7/1999 | Kim | 369/112 |
| 5,949,748 A | * | 9/1999 | Iwasaki et al. | 369/112 |
| 6,034,935 A | * | 3/2000 | Kim et al. | 369/112 |
| 6,049,518 A | * | 4/2000 | Tsuchiya et al. | 369/112 |
| 6,137,754 A | * | 10/2000 | Furukawa et al. | 369/112 |
| 6,160,783 A | * | 12/2000 | Tsuchiya et al. | 369/112 |
| 6,246,648 B1 | * | 6/2001 | Kuribayashi | 369/112 |

FOREIGN PATENT DOCUMENTS

JP 9-106566 4/1997

* cited by examiner

Primary Examiner—Nabil Hindi
(74) Attorney, Agent, or Firm—Morgan, Lewis & Bockius LLP

(57) ABSTRACT

An optical pickup system includes a light source, an objective lens, a beam splitter for splitting light received from the light source and reflected light from an optical disc, a detector for receiving the reflected light, a liquid crystal panel for providing passing light with a phase difference in accordance with a control signal and a control means for providing the control signal to the liquid crystal panel to eliminate an influence of birefringence of the optical disc.

15 Claims, 8 Drawing Sheets

| COUNTER VALUE | APPLIED VOLTAGE |
|---|---|
| A1 | V1 |
| A2 | V2 |
| ... | ... |
| Ai | Vi |
| ... | ... |
| An-1 | Vn-1 |
| An | Vn |

FIG. 5

| COUNTER VALUE | APPLIED VOLTAGE Vp1 | APPLIED VOLTAGE Vp2 |
|---|---|---|
| A1 | V1 | V'1 |
| A2 | V2 | V'2 |
| ... | ... | ... |
| Ai | Vi | V'i |
| ... | ... | ... |
| An-1 | Vn-1 | V'n-1 |
| An | Vn | V'n |

FIG. 8

OPTICAL PICKUP SYSTEM

This application claims the benefit of Japanese patent application No. 10-283399, filed Sep. 18, 1998, which is hereby incorporated by reference.

BACKGROUND OF THE INVENTION

1. Field of the Invention

The present invention relates to an optical pickup system for recording to or reading recorded information from an optical disc, and more particularly, to an optical pickup system for use with both a DVD (Digital Versatile Disc) and a CD (Compact Disc).

2. Description of the Related Art

A DVD is an optical disc that is capable of recording a large amount of digital information, such as motion picture and computer information. A DVD's recording scheme allows the recording of digital information on a disc having the same diameter as a CD, but at a recording density of six to eight times higher than the recording density of a CD. In particular, the diameter of a DVD and a CD is 12 cm.

Various methods and devices have been developed for a DVD to achieve such high density recording. For example, the wavelength of a laser light source used for a DVD is set to 650 or 634 nm (nanometers), which is much shorter than a wavelength of 780 nm used for a CD. Moreover, the numerical aperture of an objective lens for a DVD is set to 0.6, which is larger than a value of 0.45 of an objective lens for a CD. Furthermore, MPEG is used as the data compression algorithm. As a result, a DVD has a density of about 5 gigabytes, which is about eight times the density of a CD, on one side of the disc.

Due to such high density recording on a DVD, the spot diameter of the laser beam, which reads pit information from a DVD, is set to a value fairly smaller than that of a laser beam used to read information from a CD. The spot diameter of the laser beam is proportional to the wavelength $\lambda$ of the laser being used and is inversely proportional to the numerical aperture of the objective lens. Accordingly, a laser beam can have a small spot diameter if the wavelength of the laser light source is short and the numerical aperture of the objective lens is large.

Moreover, it is desired that a DVD player reproduce a CD in addition to a DVD since a DVD and a CD use a similar recording format. For example, the information items are digitally stored in a spiral track in both a DVD and a CD. However, some differences between a DVD and a CD cause problems. For example, one major difference is disc thickness. The disc substrate thickness of a DVD is equal to 0.6 mm, while that of a CD is equal to 1.2 mm. In particular, in an optical system for a DVD in which the spot diameter of a laser beam is small, the spot diameter of the laser beam becomes enlarged when using a CD due to a difference in aberration caused by the disc substrate thickness. Therefore, the information on the CD cannot be read by the same optical pickup system that is being used for a DVD.

To solve the problem caused by the disc size, a conventional optical pickup system has a liquid crystal panel that controls the numerical aperture. Such an optical pickup system with a liquid crystal panel is disclosed in Japanese laid open patent publication No. HEI 9-106566. In such a system, the liquid crystal panel has a pair of transparent electrodes with a certain aperture pattern. Furthermore, the liquid crystal panel gives a phase difference of ¼-wavelength, or an odd multiple of this wavelength, to the passing light. A voltage applied to the transparent electrodes of the panel is controlled to limit the numerical aperture. As a result, the entire liquid crystal panel functions as a ¼-wavelength plate during DVD reproduction and only the aperture area on the transparent electrodes functions as a ¼-wavelength plate during CD reproduction.

In a conventional optical system, such as the one described in the foregoing description, a laser beam from a laser source is guided to a recorded surface of a disc through a polarized beam splitter and a liquid crystal panel that functions as a ¼-wavelength plate. This beam is reflected from the disc and passes through the polarized beam splitter and the liquid crystal panel. The reflected beam is polarized 90-degrees with respect to the incident laser beam as a result of passing through the liquid crystal panel twice. Then, the reflected beam is guided to a photo detector, which is positioned in a different direction from the light source, by the polarized beam splitter. However, some optical discs have birefringence, which may also cause polarization of the reflected beam. So, the reflected beam is polarized due to the birefringence and the liquid crystal panel. As a result, the reflected beam is elliptically polarized due to the birefringence rather than being linearly polarized by the liquid crystal panel. In other words, the reflected beam contains vertical as well as parallel components in the polarization angle of the laser beam.

As a result of the polarization due to the birefringence, the amount of light received by the photo detector decreases due to the phase differences. For example, when the phase difference caused by the birefringence is $\pi$ radian, no beam is guided to the photo detector, and the information recorded on the optical disc cannot be read. Also, the amount of the birefringence depends on the area on the optical disc and thus, the polarization of the reflected beam is changed in accordance with disc rotation. As a result, jitters in the output signal of the photo detector increase since the amount of the reflected beam changes upon disc rotation. Moreover, a system is needed to eliminate the effects of aberration caused by the thickness difference in addition to eliminating the influence of birefringence.

SUMMARY OF THE INVENTION

Accordingly, the present invention is directed to an optical pickup system that substantially obviates one or more of the problems due to limitations and disadvantages of the related art.

An object of the present invention is to provide an optical pickup system with a liquid crystal panel that can reproduce a DVD and a CD by substantially reducing an influence of the birefringence of the optical disc.

Additional features and advantages of the invention will be set forth in the description which follows, and will be apparent from the description, or may be learned by practice of the invention. The objects and other advantages of the invention will be realized and attained by the structure particularly pointed out in the written description and claims hereof as well as the appended drawings.

To achieve these and other advantages in accordance with the purpose of the invention, as embodied and broadly described herein, an optical pickup system includes a light source; an objective lens; a beam splitter for splitting light received from the light source and reflected light from an optical disc; a detector for receiving the reflected light; a liquid crystal panel for providing passing light with a phase difference in accordance with a control signal; and a control means for providing the control signal to the liquid crystal panel to eliminate an influence of birefringence of the optical disc.

In another aspect, the present invention provides an optical pickup system for reproducing information from a plurality of optical discs including a first optical disc of a first thickness and a second optical disc of a second thickness that includes a light source; an objective lens; a beam splitter for splitting light received from the light source and reflected light from an optical disc; a detector for receiving the reflected light; a liquid crystal panel for providing passing light with a phase difference in accordance with a control signal; and a control means for providing the control signal to the liquid crystal panel, wherein the control means controls the liquid crystal panel such that an influence of birefringence of the first optical disc is eliminated while the optical pickup system reproduces information from the first optical disc, and an influence of birefringence of the second optical disc is eliminated and a numerical aperture is limited while the optical pickup system reproduces information from the second optical disc.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 5 is a table for calculating the applied voltage in accordance with the first embodiment of the present invention;

FIG. 8 is a table for calculating the applied voltages Vp1 and Vp2 in accordance with the second embodiment of the present invention.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 1:
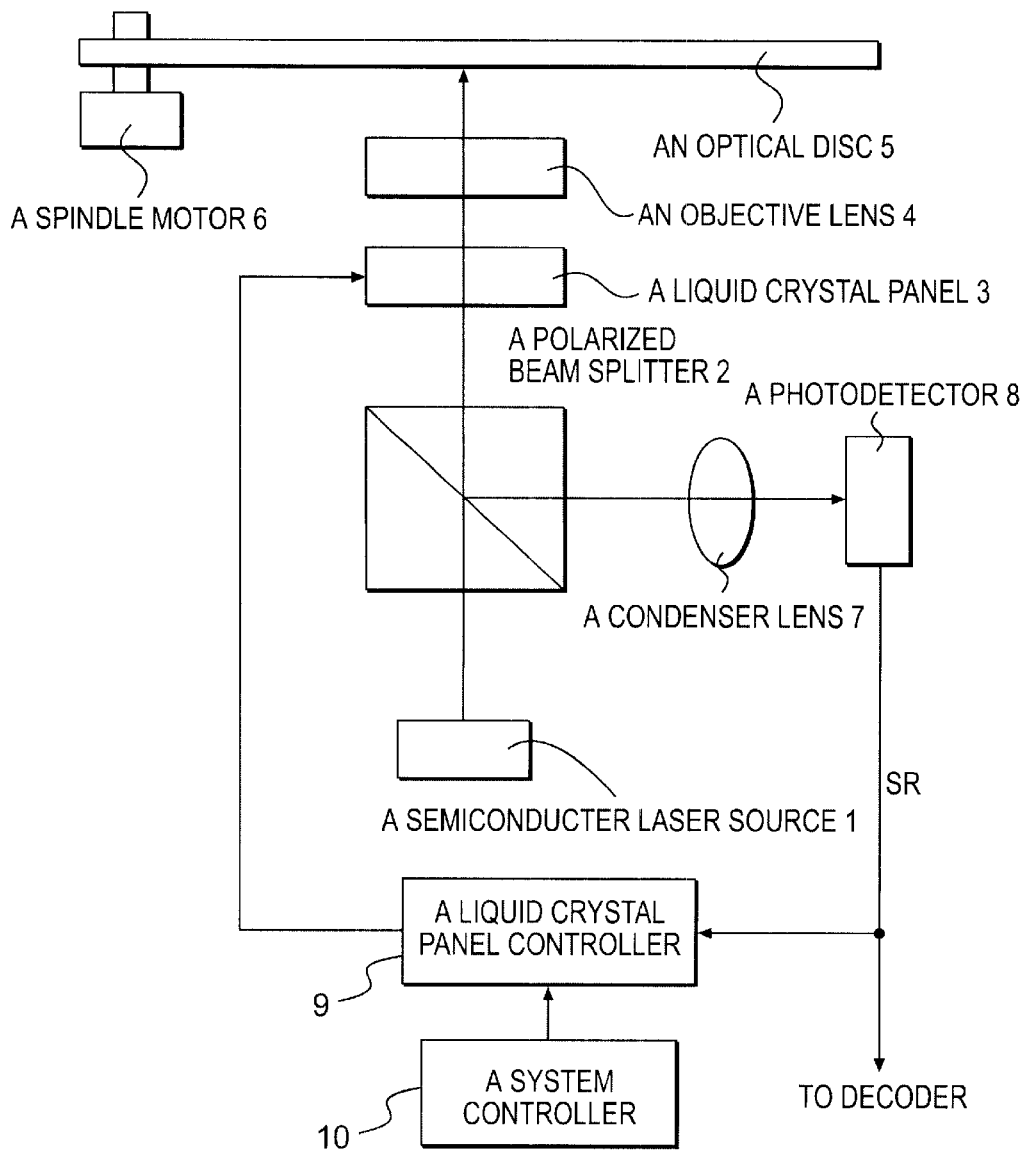
FIG. 1 is a schematic structural diagram illustrating an optical pickup system in accordance with a first embodiment of the present invention.

FIG. 1 is a schematic structural diagram illustrating an optical pickup system in accordance with a first embodiment of the present invention. In this optical pickup system of the first embodiment, the amount of light received by a detector is maximized by adjusting the phase difference of the light by a liquid crystal panel.

As shown in FIG. 1, the optical pickup system includes a semiconductor laser source 1, a polarized beam splitter 2, a liquid crystal panel 3, an objective lens 4, an optical disc 5, a spindle motor 6, a condenser lens 7, a photo detector 8, a liquid crystal panel controller 9, and a system controller 10. The spindle motor 6 rotates the optical disc 5. The system controller 10 controls the liquid crystal panel controller 9 and the rest of the system.

The operation of this optical pickup system, as shown in FIG. 1, will be described now in detail. A laser beam emitted from the semiconductor laser source 1 passes through the polarized beam splitter 2 and the liquid crystal panel 3. After passing through the liquid crystal panel 3, the laser beam is condensed by the objective lens 4 and is focused on an information recording surface of the optical disc 5. The laser beam reflected by the information recording surface of the optical disc 5 passes through the objective lens 4 and the liquid crystal panel 3, and reaches the polarized beam splitter 2. The polarized beam splitter 2 changes the light path of the reflected beam. As a result, the photo detector 8 receives the reflected beam via the condenser lens 7. The photo detector 8, for example, is divided into four light receiving elements and outputs a detected signal Sr to both the liquid crystal panel controller 9 and a reproduction processing circuit (a decoder), which is not shown in FIG. 1. The signal Sr can either be a RF signal or a focussum signal, which is a low pass filtered RF signal.

Moreover, the liquid crystal panel 3 is driven by a liquid crystal panel drive signal S1p, which is part of a control signal generated by the liquid crystal panel controller 9. The signal Si p provides the passing light beam with a phase difference. Moreover, if the optical disc has no birefringence, the liquid crystal panel 3 functions as a ¼-wavelength plate. A ¼-wavelength plate provides a phase difference of ¼ of the wavelength of the laser beam. The structure and operation of the liquid crystal panel 3 will be described next in detail by referring to FIGS. 2A, 2B, and 2C.

Figure 2A:
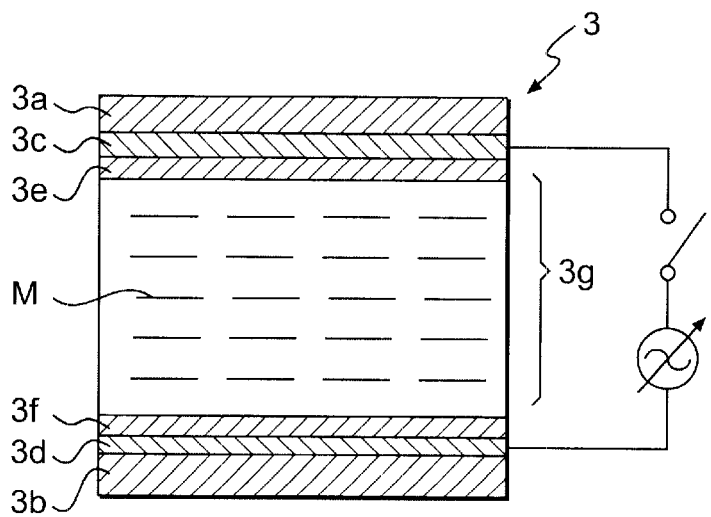
FIGS. 2A, 2B, and 2C are diagrams illustrating the structure of a liquid crystal panel for use in an optical pickup system, and the operation of this liquid crystal panel when a voltage is applied to it.
Figure 2B:
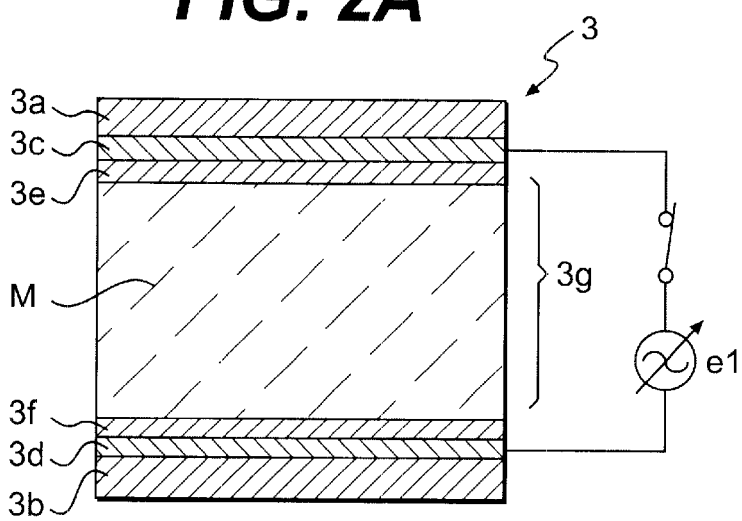
Figure 2C:
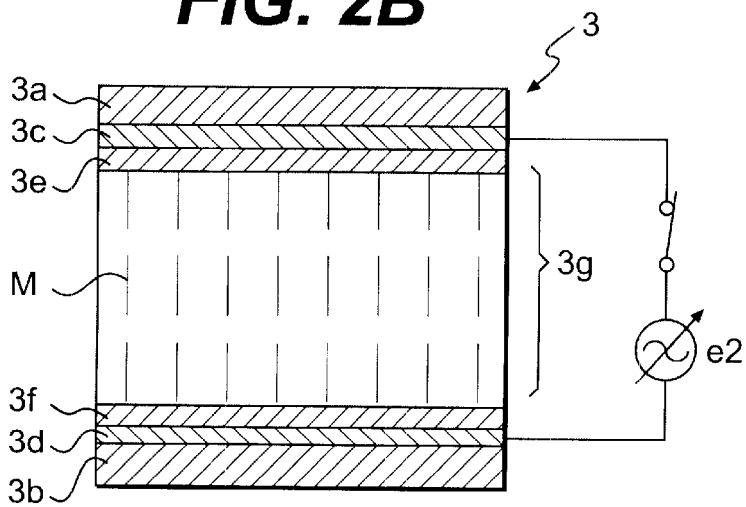

FIGS. 2A, 2B, and 2C show schematic structural diagrams of the liquid crystal panel 3, which eliminates an influence of birefringence of an optical disc. FIG. 2A is a schematic sectional view of the liquid crystal panel 3 when no voltage is being applied. On the other hand, FIGS. 2B and 2C are schematic sectional views when certain voltages e1 and e2 are applied, respectively.

As shown in FIGS. 2A, 2B, and 2C, the liquid crystal panel 3 includes transparent glass substrates 3a and 3b and a pair of transparent electrodes 3c and 3d, which are made of a substance such as ITO (Indium Tin Oxide) and are deposited by evaporation on the inner surfaces of the glass substrates. Moreover, the liquid crystal panel 3 includes orientation films 3e and 3f that are formed on the inner surfaces of the transparent electrodes 3c and 3d.

Furthermore, the liquid crystal panel 3 also has a liquid crystal 3g, which includes the liquid crystal molecules M, and is sealed in a gap between the orientation films 3e and 3f. These orientation films give a predetermined orientation to the liquid crystal molecules M. In the present embodiment, the transparent electrodes 3c and 3d are not divided. When an optical disc has no birefringence, the liquid crystal panel functions as a ¼-wavelength plate by applying a predetermined voltage to the transparent electrodes 3c and 3d.

A liquid crystal 3g is a noematic liquid crystal or a similar liquid crystal that has birefringence. Accordingly, the liquid crystal 3g has different refractive indexes in the direction of the optical axis and the direction vertical to that of the liquid crystal molecules M. Moreover, the orientation of the liquid crystal molecules M can be changed by varying applied voltages to the transparent electrodes 3c and 3d, as shown in FIGS. 2A, 2B and 2C. Since, the length of the optical path is controlled in accordance with a change of the refractive index of the liquid crystal 3g by varying the applied voltage, a desired phase difference can be added to the laser beam passing through the liquid crystal panel 3.

Figure 3:
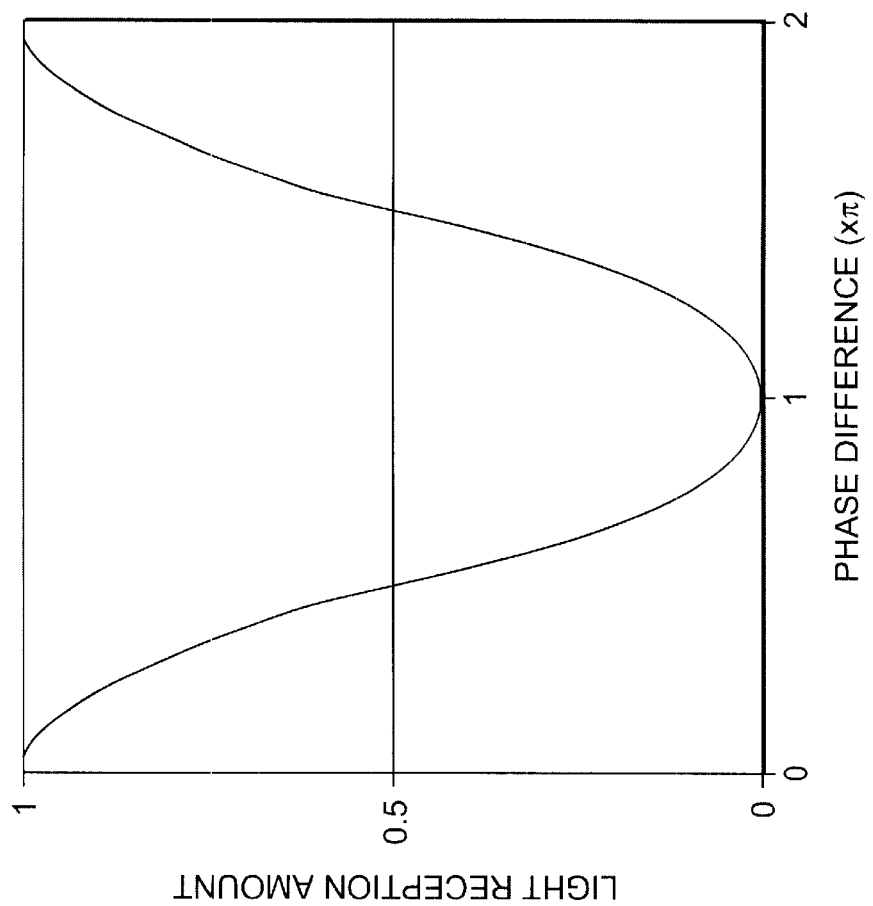
FIG. 3 is a graph showing the characteristics between a light reception amount and a phase difference resulting from a liquid crystal panel.

A method for eliminating the influence of the birefringence of the optical disc will be explained now by referring to FIG. 3. In FIG. 3, the graph shows a relationship between the phase difference caused by the birefringence, which is represented by the horizontal axis, and the total amount of reflected light received by the photo detector when the liquid crystal panel functions as a ¼-wavelength plate, which is represented by the vertical axis. This graph clearly demonstrates that when the liquid crystal panel functions as a ¼-wavelength plate, the light reception amount decreases when the phase difference due to the birefringence is also present. The reason for the decrease in the amount of light is because the phase difference due to the birefringence changes the polarization of the light beam. For example, if the given phase difference is $\pi$ radian, the reflected light beam passes through the polarized beam splitter instead of being directed to the photo detector because the liquid crystal panel gives a phase difference of $\pi/2$ radian to the light beam. As a result, no reflected light beam reaches the photo detector.

The influence of the birefringence can be eliminated by controlling the voltage applied to the liquid crystal panel, which normally functions as a ¼ wavelength plate. In particular, the phase difference given to the reflected light is changed and thus, the reflected light can reach the photo detector. Moreover, a phase difference that eliminates the birefringence effect of the optical disc can be given to the light beam by controlling the applied voltage such that the photo detector 8 receives a maximum amount of light. To increase the light received, the applied voltage is controlled to maximize the amplitude of the RF or the focussum signal by observing the variations in the focussum or the RF signal resulting from the birefringence.

Figure 4:
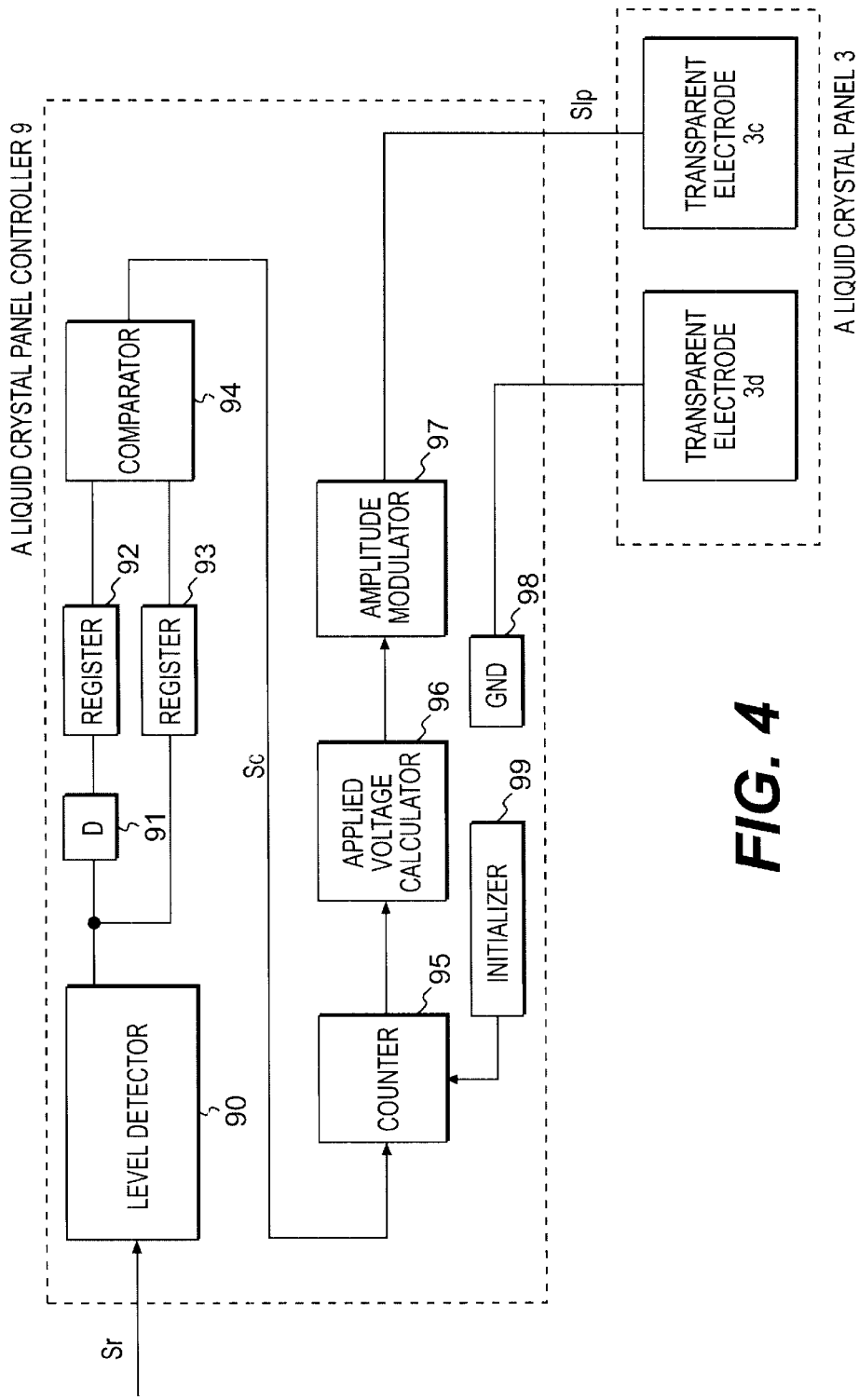
FIG. 4 is a block diagram of a liquid crystal panel controller in accordance with the first embodiment of the present invention.

The structure of the liquid crystal panel controller 9 will be described now by referring to FIG. 4. FIG. 4 is a block diagram of the liquid crystal panel controller 9. The liquid crystal panel controller 9 includes a level detector 90 for detecting the level of the focussum or the RF signal Sr received from the photo detector 8; a delay circuit 91; registers 92 and 93 for holding an output of the level detector 90; a comparator 94 for comparing the levels of registers 92 and 93 and outputting the results of the comparison; a counter 95 for performing a counting operation according to the result from the comparator 94 and for outputting a counter value; an applied voltage calculator 96 for calculating applied voltages, which are to be applied to the liquid crystal panel, corresponding to the counter values received from the counter 95; an amplitude modulator 97 for modulating the calculated applied voltage and outputting the liquid crystal panel drive signal S1p; a ground terminal 98 for the liquid crystal panel 3; and an initializer 99 for setting the initial value of the counter 95.

The operation of the liquid crystal panel controller 9 will be described now in detail. First, the level detector 90 detects the level of the signal Sr from the photo detector 8 at a predetermined interval $\Delta t$. The level detector 90 can either detect the level of the focussum signal or the amplitude of the RF signal depending on whether the signal Sr is a focussum or an RF signal. In the following description, a focussum signal will be used as reference. The output of the level detector 90 is sent to registers 92 and 93. However, the output sent to register 92 is delayed $\Delta t$ by the delay circuit 91. Therefore, at time T, the register 92 holds a signal level detected at time T-$\Delta t$, while the register 93 holds a signal level detected at time T.

Next, the comparator 94 compares the levels of the focussum signal in registers 92 and 93 and outputs a comparison signal Sc. The comparison signal Sc is a voltage. In particular, Sc is +a (V) when the level in register 93 is larger than the level in register 92, meaning that the level of focussum signal at time T is larger than the level at time T-$\Delta t$. Alternatively, Sc is -a (V) when the level in register 93 is smaller than the level in register 92, meaning that the level of the focussum signal at time T is smaller than the level at time T-$\Delta t$. Finally, Sc can also be 0 (V) when the levels in both the registers are the same, meaning that the level of the focussum signal at time T is the same as the level at time T-$\Delta t$.

Next, the initializer 99 sets the initial counter value of the counter 95. The counter 95 determines the counter value according to the comparison signal Sc sent from the comparator 94 as follows: if the comparison signal Sc is +a (V), then the counter 95 decreases the counter value by one; if the comparison signal Sc is -a (V), then the counter value is increased by one; and if the comparison signal Sc is 0 (V), then the counter value is not changed. As a result, it is possible to maximize the focussum signal. Then, the counter 95 outputs the counter value to the applied voltage calculator 96.

Next, the applied voltage calculator 96 calculates the applied voltage corresponding to the counter value sent from the counter 95 and outputs the applied voltage to the amplitude modulator 97. The applied voltage calculator 96 has a ROM that contains a table of counter values and the corresponding applied voltages, as shown in FIG. 5. The applied voltage calculator 96 uses this table to determine the applied voltage, which is applied to the liquid crystal panel 3, corresponding to the input counter value. The applied voltages stored in the ROM are determined experimentally and are the most appropriate values to eliminate the influence of birefringence. In other words, these applied voltages, which are stored in the ROM, give the most appropriate phase difference to a light beam to eliminate the influence of birefringence. The applied voltages are set so that the phase difference given by the liquid crystal panel becomes larger as the counter value increases. The address Ai of the ROM in FIG. 5 contains the initial value, which is set by the initializer 99. The applied voltage Vi corresponding to Ai makes the liquid crystal panel function as a ¼ wavelength plate, which gives the passing light beam a phase difference of $\pi/2$.

Finally, the applied voltage calculated by the applied voltage calculator 96 is converted into a corresponding pulse signal by the amplitude modulator 97 and sent to the transparent electrode 3c of the liquid crystal panel 3 as the liquid crystal panel drive signal S1p.

The first embodiment maximizes the amount of the light received in the photo detector. However, the present invention is not limited to this. For example, instead of maximizing the amount of the light received by the photo detector, it is possible to control the liquid crystal panel so that the amount of the light received by the photo detector is larger than a predetermined amount.

The first embodiment of the invention provides an optical pickup system to prevent a decrease in the reception of a light beam. The decrease in such cases is a result of the birefringence of the optical disc. In this first embodiment, the phase differences given by the liquid crystal panel were controlled so that the amount of light received at the photo detector was maximized. However, the second embodiment provides an optical pickup system for reproducing information from discs with different substrate thicknesses. For example, the optical pickup system of the second embodiment can reproduce both a CD with a substrate thickness of 1.2 mm and a DVD with a substrate thickness of 0.6 mm.

The second embodiment provides an optical system for eliminating the effects of spherical aberration caused by the thickness difference in addition to eliminating the influences of the birefringence of the optical disc.

The optical pickup system of the second embodiment has substantially the same construction as that of the first embodiment except for the liquid crystal panel 3 and the liquid crystal panel controller 9. Therefore, only the structure and operation of these two components will be described in the following description by referring to FIGS. 6A, 6B, 6C, 7, and 8.

Figure 6A:
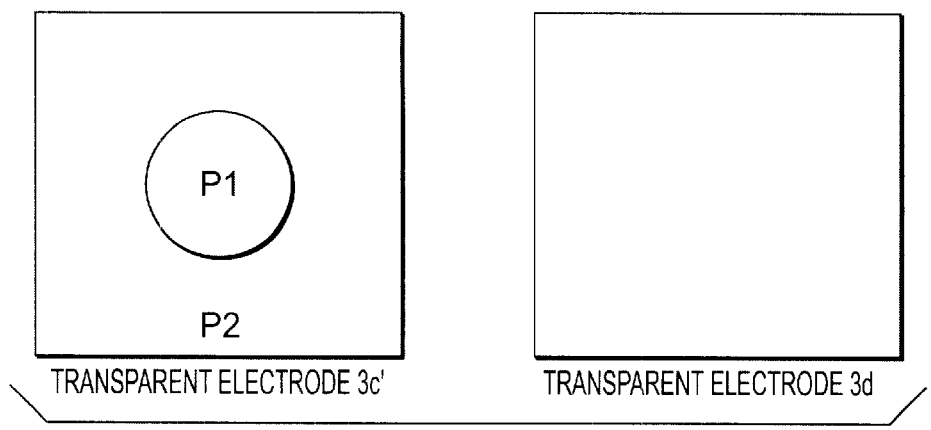
FIGS. 6A, 6B, and 6C are diagrams showing the structure of another liquid crystal panel for use in an optical pickup system, and the operation of this liquid crystal panel when a voltage is applied to it in accordance with a second embodiment of the present invention.
Figure 6B:
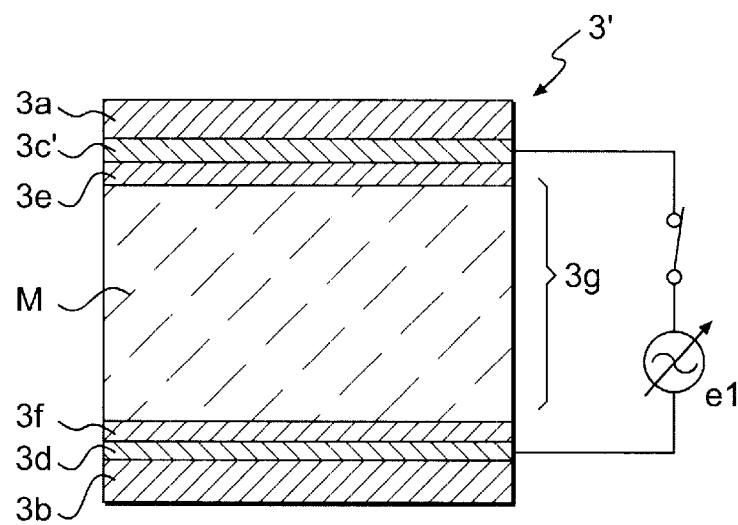
Figure 6C:
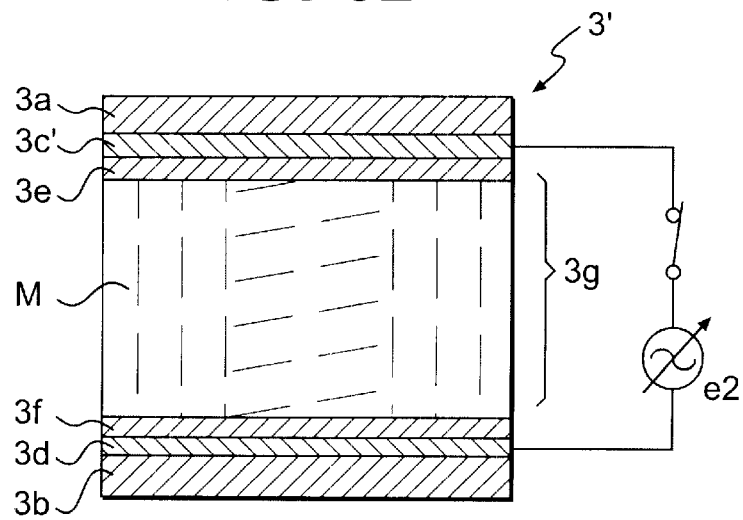

FIGS. 6A, 6B, and 6C show a schematic structural diagram of the liquid crystal panel 3' for use in an optical pickup system. FIG. 6A is a schematic plain view of a pair of electrodes of the liquid crystal panel 3'. FIGS. 6B and 6C are schematic sectional views of the liquid crystal panel 3'. In FIGS. 6B and 6C, same reference numbers are used for referring to like parts of the liquid crystal panel 3 of the first embodiment. As shown in FIG. 6A, the transparent electrode 3c' is divided into two areas: a center area P1 and a peripheral area P2. Moreover, P1 and P2 are isolated electrically so that different voltages Vp1 and Vp2 can be applied to each area separately.

By dividing the transparent electrodes 3c' into two areas and by applying Vp1 to the center area P1 and Vp2 to the peripheral area P2, the tilt angle of the liquid crystal molecules in these areas can be controlled independently, as shown in FIG. 6C. If the same voltage is applied to both the center area P1 and the peripheral area P2, the tilt angle of the whole liquid crystal panel is controlled together, as shown in the first embodiment and in FIG. 6B.

In an optical pickup system of the second embodiment, when a DVD is played, a voltage that gives the passing light beam a phase difference of $\pi/2$ is applied to both the center area P1 and the peripheral area P2. Thus, the whole area of the liquid crystal panel functions as a ¼ wavelength plate. However, when a CD is played, a voltage that gives the passing light beam a phase difference of $\pi/2$ in the center area P1 and a voltage that gives the passing light beam a phase difference of $\pi$ in the peripheral area P2 is applied. Thus, only the reflected light beam that passes through the center area of the liquid crystal panel is guided to the photo detector via the polarized beam splitter. As a result, the peripheral light beam is substantially omitted when a CD is played by operating only the center area of the liquid crystal panel as a ¼-wavelength plate.

Moreover, if no birefringence exists, a voltage can be applied to the liquid crystal panel 3' such as to give a phase difference, as described in the foregoing description. However, if birefringence exists, it is possible to control the applied voltage so that the amount of the receiving light can be maximized in accordance with the polarization change of the light beam, as described in the first embodiment.

Figure 7:
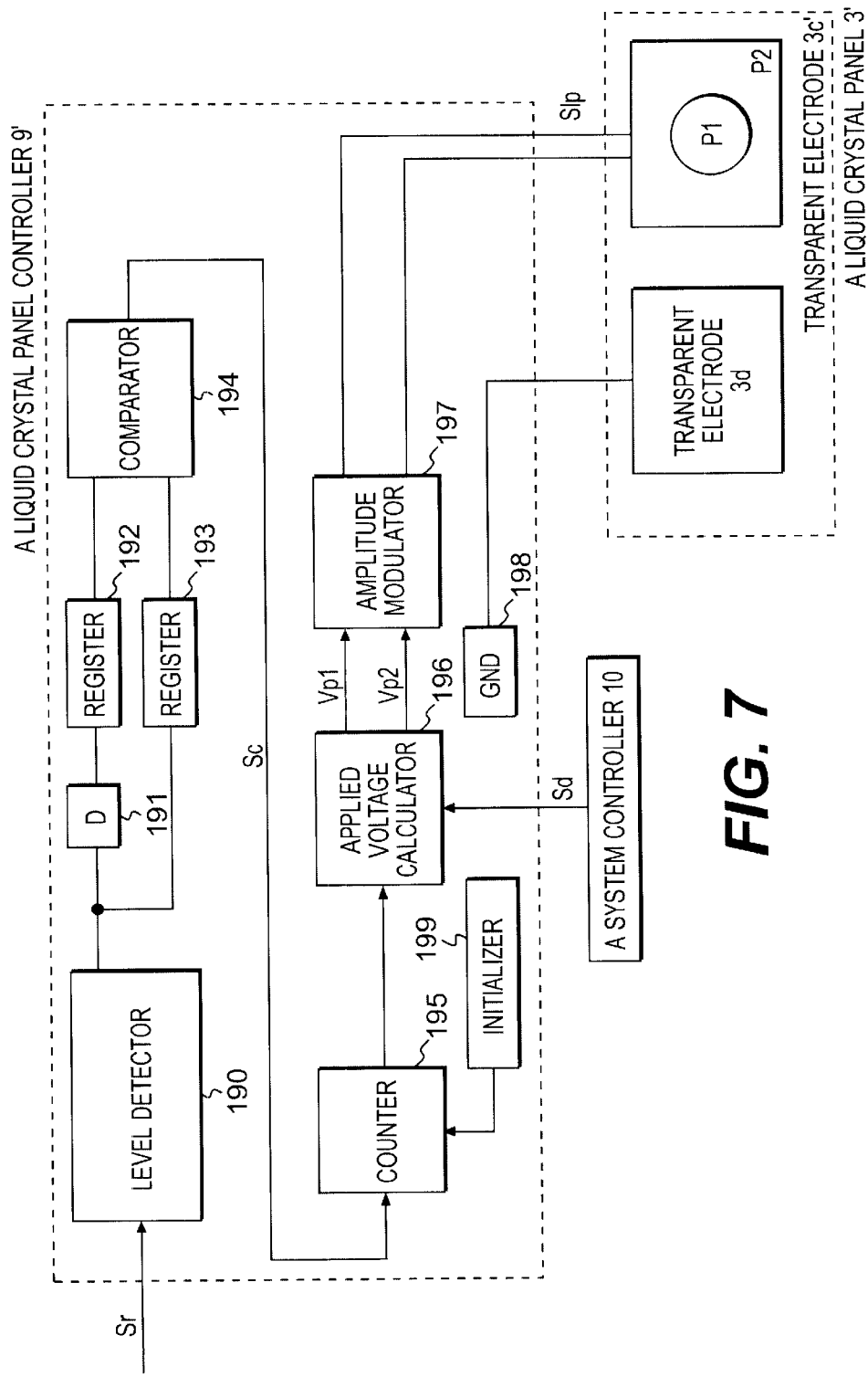
FIG. 7 is a block diagram of a liquid crystal panel controller in accordance with the second embodiment of the present invention.

FIG. 7 shows a structural block diagram of the liquid crystal panel controller 9' in accordance with the second embodiment of the present invention. The liquid crystal panel controller 9' includes a level detector 190 for detecting the level of the RF or the focussum signal Sr, which is an output of the photo detector 8; a delay circuit 191; registers 192 and 193 for holding an output of the level detector 190; a comparator 194 for comparing the levels of register 192 and 193, and outputting the results of the comparison; a counter 195 for performing the counting operation according to the comparison result of the comparator 194 and outputting the counter value; an applied voltage calculator 196 for calculating the applied voltages Vp1 and Vp2, which are to be applied to the liquid crystal panel 3', corresponding to the counter values received from the counter 195; an amplitude modulator 197 for modulating the calculated applied voltages and outputting the liquid crystal panel drive signal S1p; a ground terminal 198 for the liquid crystal panel 3'; and an initializer 199 for setting the initial value of the counter 95.

The operation from the level detector 190 to the counter 195 of the liquid crystal panel controller 9' is the same as the liquid crystal panel controller 9 of the first embodiment. Accordingly, only elements that function differently will be described in detail. The applied voltage calculator 196 calculates the applied voltages corresponding to the counter value received from the counter 195, and outputs the applied voltages to the amplitude modulator 197. The applied voltage calculator 196 has a ROM that contains a table of counter values and the corresponding voltages Vp1 and Vp2, as shown in FIG. 8. The applied voltage calculator 196 uses this table to determine the applied voltages Vp1 and Vp2, which are applied to the liquid crystal panel 3', corresponding to the input counter value. The applied voltages stored in the ROM are determined experimentally and are the most appropriate values to eliminate the influence of the birefringence of an optical disc. In other words, these applied voltages, which are stored in the ROM, give the most appropriate phase difference to a light beam to eliminate the influence of birefringence. Moreover, the applied voltages Vp1 and Vp2 are set so that the phase difference given by the liquid crystal panel 3' becomes larger as the counter value increases. The applied voltage Vp2 can be set as Vp2=Vp1+$\Delta$V, where $\Delta$V is a constant value.

Next, the applied voltages Vp1 and Vp2 from the applied voltage calculator 196 are converted into corresponding pulse signals by the amplitude modulator 197, and sent to the center area P1 and the peripheral area P2 of the transparent electrode 3c' of the liquid crystal panel 3' as the liquid crystal panel drive signal S1p.

Moreover, the system controller 10' also controls the liquid crystal panel controller 9' as well as the rest of the system. In particular, the system controller 10 supplies a disc ID signal Sd to the applied voltage calculator 196. The disc ID signal indicates whether the current disc in the system is a DVD or CD, which can be determined based on a focus error signal, for example.

When the disc ID signal Sd indicates that the current disc is a DVD, the applied voltage Vp1 corresponding to the counter value from the counter 195 is determined using the table in the ROM and is set as the applied voltage to both the center area P1 and the peripheral area P2 of the transparent electrode 3c'. Since the system contains a DVD, it is not necessary to limit the numerical aperture. Therefore, the applied voltage Vp2 is automatically set to the same value as Vp1 without referring to the table in the ROM. For example, when the counter value from the counter 195 is A2, the applied voltage Vp1 is set to V2 by referring to the table in the ROM. Then, Vp2 is also set to V2. Therefore, both Vp1, the applied voltage to the center area P1 of the transparent electrode 3c', and Vp2, the applied voltage to the peripheral area P2 of the transparent electrode 3c', are set as the same voltage V2.

Alternatively, when the disc ID signal Sd indicates that the current disc is a CD, the applied voltage Vp1 corresponding to the counter value from the counter 195 is determined using the table in the ROM and is set as the applied voltage to the center area P1 of the transparent electrode 3c'. Similarly, the applied voltage Vp2 is also determined from the table in the ROM at the same time and is set as the applied voltage to the peripheral area P2 of the transparent electrode 3c'. For example, when the counter value from the counter 195 is A2, the applied voltage Vp1 is set to V2 and the applied voltage Vp2 is set to V'2 by using the table in the ROM. Therefore, the applied voltage Vp1 to the center area P1 is set to V2 and the applied voltage Vp2 to the peripheral area P2 is set to V'2.

As mentioned in the foregoing description, the applied voltages Vp1 and Vp2 give the most appropriate phase difference to the light beam in order to eliminate the influence of the birefringence of the optical disc. The applied voltage Vp1 gives a phase difference to the liquid crystal panel so that the amount of light received by the photo detector 8 is maximized. On the other hand, the applied voltage Vp2 gives a phase difference to the liquid crystal panel so that the amount of the light beam received by the photo detector 8 is minimized. Moreover, Ai contains an initial value, which is set by the initializer 199. The applied voltage Vp1 is correspondingly set to Vi, and the applied voltage Vp2 is correspondingly set to V'i. As a result, the phase difference given to the liquid crystal panel is such that the liquid crystal panel functions as a ¼ wavelength plate. Moreover, the applied voltage Vp2 gives a phase difference to the liquid crystal panel such that the reflected light beam passes through the polarized beam splitter.

Accordingly, in the second embodiment of the present invention, it is simultaneously possible to maximize the amount of light received through the center area of the liquid crystal panel and minimize the amount of light received through the peripheral area of the liquid crystal panel. Moreover, it is possible to eliminate the influence of spherical aberration caused by the difference in the disc substrate thickness of a DVD and a CD. Furthermore, it is also possible to eliminate the influence of birefringence, which causes a decrease in the light received by the photo detector, by giving a phase difference to the light beam passing through the liquid crystal panel. As a result of this phase difference, the amount of light received by the photo detector is maximized.

While the invention has been described in detail and with reference to specific embodiments thereof, it will be apparent to one skilled in the art that various changes and modifications can be made therein without departing from the spirit or scope thereof. Thus, it is intended that the present invention covers the modifications and variations of this invention provided they come within the scope of the appended claims and their equivalents.

What is claimed is:

1. An optical pickup system, comprising:
    a light source;
    an objective lens;
    a beam separator for separating light received from the light source and reflected light from an optical disc;
    a detector for receiving the reflected light;
    a liquid crystal panel for providing passing light with a phase difference in accordance with a control signal; and
    a controller for providing the control signal to the liquid crystal panel to eliminate an influence of birefringence of the optical disc by causing the liquid crystal panel to provide the passing light with the phase difference in accordance with the control signal,
    wherein the controller adjusts a voltage applied to the liquid crystal panel such that an output signal generated by the detector has a maximum value.

2. The optical pickup system according to claim 1, wherein the output signal is a focussum signal or an amplitude of an RF signal.

3. The optical pickup system according to claim 1, wherein the output signal of the detector is an RF signal or a focussum signal that is a low pass filtered RF signal.

4. The optical pickup system according to claim 1, wherein the liquid crystal panel is positioned between the objective lens and the beam separator.

5. The optical pickup system according to claim 1, further comprising a system controller for controlling the optical pickup system.

6. An optical pickup system for reproducing information from a plurality of optical discs including a first optical disc of a first thickness and a second optical disc of a second thickness, comprising:
    a light source;
    an objective lens;
    a beam separator for separating light received from the light source and reflected light from an optical disc;
    a detector for receiving the reflected light;
    a liquid crystal panel for providing passing light with a phase difference in accordance with a control signal; and
    a controller for providing the control signal to the liquid crystal panel, wherein the controller controls the liquid crystal panel such that an influence of birefringence of the first optical disc is eliminated by causing the liquid crystal panel to provide the passing light with the phase difference in accordance with the control signal while the optical pickup system reproduces information from the first optical disc, and an influence of birefringence of the second optical disc is eliminated and a numerical aperture is limited while the optical pickup system reproduces information from the second optical disc.

7. The optical pickup system according to claim 6, wherein an electrode of the liquid crystal panel is divided into a center area and a peripheral area.

8. The optical pickup system according to claim 7, wherein the liquid crystal panel independently provides a phase difference at the center area and at the peripheral area, and wherein the liquid crystal panel may provide a first phase difference at the center area and a second phase difference at the peripheral area.

9. The optical pickup system according to claim 8, wherein the second thickness is greater than the first thickness.

10. The optical pickup system according to claim 6, wherein the second thickness is greater than the first thickness.

11. The optical pickup system according to claim 9, wherein the controller applies a same voltage to the center area and the peripheral area of the liquid crystal panel while reproducing from the first optical disc and applies different voltages to the center area and the peripheral area of the liquid crystal panel while reproducing from the second optical disc.

12. The optical pickup system according to claim 10, wherein the liquid crystal panel independently provides a phase difference at a center area and at a peripheral area of the liquid crystal panel, and wherein the liquid crystal panel may provide a first phase difference at the center area and a second phase difference at the peripheral area.

13. The optical pickup system according to claim 12, wherein the controller applies a same voltage to the center area and the peripheral area of the liquid crystal panel while reproducing from the first optical disc and applies different voltages to the center area and the peripheral area of the liquid crystal panel while reproducing from the second optical disc.

14. The optical pickup system according to claim 6, further comprising a system controller for controlling the optical pickup system.

15. The optical pickup system according to claim 14, wherein the system controller sends a signal to the controller indicating whether the optical pickup system contains a DVD or a CD.

\* \* \* \* \*